(12) United States Patent
Lindbo et al.

(10) Patent No.: US 11,667,456 B2
(45) Date of Patent: Jun. 6, 2023

(54) TEMPERATURE CONTROLLED STORAGE SYSTEM

(71) Applicant: OCADO INNOVATION LIMITED, Hatfield (GB)

(72) Inventors: Lars Sverker Ture Lindbo, Hatfield (GB); Mark Fryer, Hatsfield (GB); Martyn Lee Bates, Hatsfield (GB); Kevin Faux, Hatsfield (GB); Timothy Deighton Steiner, Hatsfield (GB); Siddique Shaihk, Hatsfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 15/579,108

(22) PCT Filed: Jun. 3, 2016

(86) PCT No.: PCT/EP2016/062632
§ 371 (c)(1),
(2) Date: Dec. 1, 2017

(87) PCT Pub. No.: WO2016/193419
PCT Pub. Date: Dec. 8, 2016

(65) Prior Publication Data
US 2018/0170650 A1    Jun. 21, 2018

(30) Foreign Application Priority Data

Jun. 3, 2015 (GB) .................... 1509661
Mar. 10, 2016 (GB) .................... 1604096

(51) Int. Cl.
*B65D 81/26* (2006.01)
*B65G 1/04* (2006.01)
(Continued)

(52) U.S. Cl.
CPC ....... *B65D 81/263* (2013.01); *B65D 21/0209* (2013.01); *B65D 25/14* (2013.01);
(Continued)

(58) Field of Classification Search
CPC ..... B65D 21/0209; F25D 13/02; F25D 13/06; F25D 25/04; F25D 2400/20; B65G 1/0464; B65G 1/0478
See application file for complete search history.

(56) References Cited

U.S. PATENT DOCUMENTS 2,069,747 A * 2/1937 Atkins .................. B65D 85/34
217/40
2,701,065 A   2/1955 Bertel
(Continued)

FOREIGN PATENT DOCUMENTS

CN   102428374 A   4/2012
CN   203388175 U   1/2014
(Continued)

OTHER PUBLICATIONS

International Search Report (PCT/ISA/210) dated Aug. 29, 2016, by the Japanese Patent Office as the International Searching Authority for International Application No. PCT/EP2016/062632.
(Continued)

*Primary Examiner* — Lionel Nouketcha
(74) *Attorney, Agent, or Firm* — Buchanan Ingersoll & Rooney PC

(57) ABSTRACT

The present disclosure relates to stacked, grid storage systems such as densely packed storage systems, and methods of adjusting, regulating, controlling and maintaining the temperature of storage systems.

15 Claims, 15 Drawing Sheets

Figure 1:
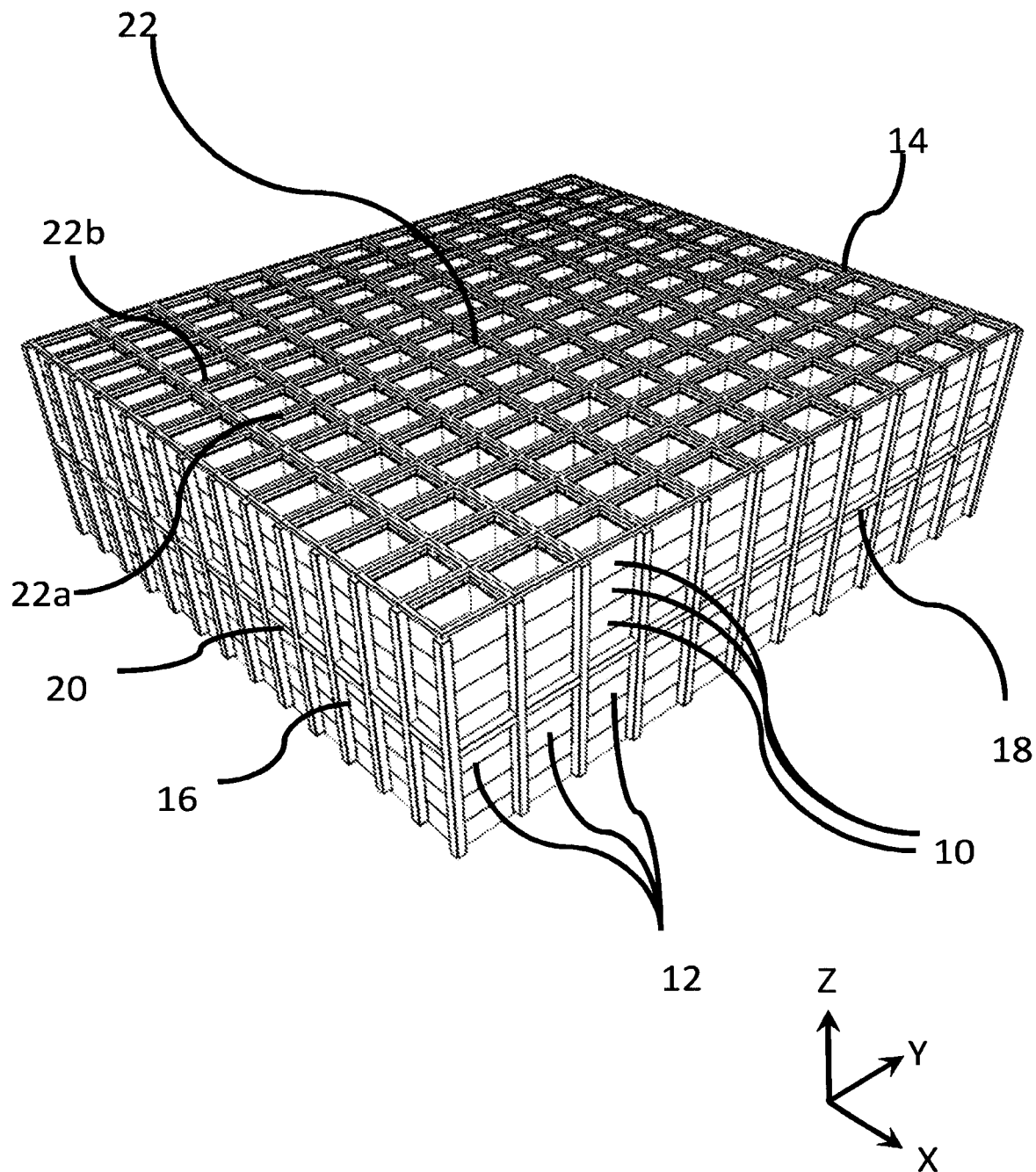

(51) Int. Cl.

| | |
|---|---|
| *F25D 13/00* | (2006.01) |
| *B65D 21/02* | (2006.01) |
| *F25D 13/02* | (2006.01) |
| *F25D 25/00* | (2006.01) |
| *F25D 13/06* | (2006.01) |
| *B65D 25/14* | (2006.01) |
| *F25D 25/04* | (2006.01) |

(52) U.S. Cl.
CPC .......... *B65G 1/0464* (2013.01); *F25D 13/00* (2013.01); *F25D 13/02* (2013.01); *F25D 25/005* (2013.01); *B65D 2205/02* (2013.01); *F25D 13/06* (2013.01); *F25D 25/04* (2013.01); *F25D 2317/0664* (2013.01)

(56) References Cited

U.S. PATENT DOCUMENTS

| | | | |
|---|---|---|---|
| 2,962,875 A | 12/1960 | Barreoro | |
| 3,021,691 A | 2/1962 | Jacobs | |
| 3,621,672 A | 11/1971 | Meredith | |
| 3,651,977 A | 3/1972 | Morgan | |
| 4,063,432 A | 12/1977 | Chaussy et al. | |
| 4,474,020 A * | 10/1984 | Freeman | A23B 7/0433 312/296 |
| 4,671,074 A | 6/1987 | Gostelow et al. | |
| 4,676,152 A * | 6/1987 | Tsuji | A23B 7/0053 99/468 |
| 4,736,592 A | 4/1988 | Ohling | |
| 4,775,001 A * | 10/1988 | Ward | F24F 3/00 165/57 |
| 5,321,907 A * | 6/1994 | Ueno | B65D 85/52 206/423 |
| 5,497,698 A * | 3/1996 | Bolkestein | A23B 7/148 99/467 |
| 5,556,658 A | 9/1996 | Raudalus et al. | |
| 5,752,602 A | 5/1998 | Ackermann et al. | |
| 5,778,557 A | 7/1998 | Levens | |
| 6,041,931 A | 3/2000 | Jacques | |
| 6,318,113 B1 * | 11/2001 | Levy | F24F 3/044 62/426 |
| 6,654,662 B1 | 11/2003 | Hognaland | |
| 6,675,603 B1 * | 1/2004 | Lesyna | F25D 17/065 62/258 |
| 6,740,346 B2 * | 5/2004 | Shapiro | B65B 25/041 220/495.03 |
| 6,776,003 B1 * | 8/2004 | Bollen | B65D 88/745 62/407 |
| 7,178,356 B1 | 2/2007 | Lingelbach et al. | |
| 7,752,867 B2 * | 7/2010 | Lehmann | B63B 57/04 62/414 |
| 8,628,289 B1 | 1/2014 | Benedict et al. | |
| 2006/0272350 A1 * | 12/2006 | Weeth | F25D 17/06 62/419 |
| 2007/0007293 A1 | 1/2007 | Sambrailo et al. | |
| 2007/0169503 A1 * | 7/2007 | Kikuchi | F25B 9/004 62/402 |
| 2009/0241578 A1 | 10/2009 | Carlson et al. | |
| 2010/0024465 A1 | 2/2010 | Guyomar | |
| 2010/0326625 A1 * | 12/2010 | Slegten | G01F 1/698 165/59 |
| 2011/0107784 A1 * | 5/2011 | Tippmann | F25D 17/06 62/340 |
| 2011/0192082 A1 | 8/2011 | Uchiyama | |
| 2014/0273793 A1 | 9/2014 | Tippmann | |
| 2015/0127143 A1 * | 5/2015 | Lindbo | B65G 1/0464 700/218 |
| 2016/0129587 A1 | 5/2016 | Lindbo et al. | |
| 2018/0142947 A1 | 5/2018 | Bates et al. | |
| 2018/0170650 A1 | 6/2018 | Lindbo et al. | |

FOREIGN PATENT DOCUMENTS

| | | |
|---|---|---|
| DE | 100 11 205 A1 | 9/2001 |
| EP | 0 201 183 A2 | 11/1986 |
| EP | 0 767 113 A2 | 4/1997 |
| EP | 1 037 828 A1 | 9/2000 |
| EP | 2 308 283 A1 | 4/2011 |
| EP | 3303186 A1 | 4/2018 |
| FR | 2 401 842 A1 | 3/1979 |
| GB | 2 517 264 A | 2/2015 |
| JP | S50-064845 A | 6/1975 |
| JP | S58-174681 U | 11/1983 |
| JP | 02-265802 A | 10/1990 |
| JP | 11-137072 A | 5/1999 |
| JP | 2002-087474 A | 3/2002 |
| JP | 2015-190678 A | 11/2015 |
| SG | 189722 A1 | 5/2013 |
| WO | WO 94/10849 A1 | 5/1994 |
| WO | WO 98/49075 A1 | 11/1998 |
| WO | WO 00/75041 A1 | 12/2000 |
| WO | WO 03/022685 A2 | 3/2003 |
| WO | WO 2014/203126 A1 | 12/2014 |
| WO | WO 2015/019055 A1 | 2/2015 |
| WO | WO 2015/185628 A2 | 12/2015 |
| WO | 2016193419 A1 | 12/2016 |

OTHER PUBLICATIONS

Written Opinion (PCT/ISA/237) dated Aug. 29, 2016, by the Japanese Patent Office as the International Searching Authority for International Application No. PCT/EP2016/062632.
International Search Report (PCT/ISA/210) dated Aug. 30, 2016, by the European Patent Office as the International Searching Authority for International Application No. PCT/EP2016/062631.
Written Opinion (PCT/ISA/237) dated Aug. 30, 2016, by the European Patent Office as the International Searching Authority for International Application No. PCT/EP2016/062631.
Search Report dated Dec. 22, 2016, by the British Patent Office for Application No. 1609753.7.
Office Action dated Feb. 2, 2021 in corresponding Japanese Patent Application No. 2018-515351, with English translation, 7 pages.
Office Action dated Feb. 9, 2022, by the Israeli Patent Office in corresponding Israeli Patent Application No. 285602. (7 pages).
Office Action dated Jun. 29, 2021, by the Canadian Patent Office in corresponding Canadian Patent Application No. 2,988,019. (5 pages).
Office Action (Text of the Notification of Reexamination) dated May 9, 2022, by the Chinese Patent Office in corresponding Chinese Patent Application No. 201680032269.5, and an English Translation of the Office Action. (14 pages).
Office Action (Notification of Reexamination) dated Sep. 19, 2022, by the Chinese Patent Office in corresponding Chinese Patent Application No. 201680032269.5, and an English Translation of the Office Action. (8 pages).
Office Action dated Oct. 6, 2022, by the Canadian Patent Office in corresponding Canadian Patent Application No. 2,988,019. (3 pages).
Office Action (Reexamination Decision) dated Nov. 24, 2022, by the Chinese Patent Office in corresponding Chinese Patent Application No. 201680032269.5, and a partial English Translation of the Office Action. (14 pages).
Office Action (Communication pursuant to Article 94(3) EPC) dated Jan. 26, 2023, by the European Patent Office in corresponding European Patent Application No. 16 734 199.9-1017. (9 pages).
English translation of the First Office Action dated Jan. 31, 2023, by the Japan Patent Office in corresponding Japanese Patent Application No. 2021-199021. (4 pages).

* cited by examiner

PRIOR ART

TEMPERATURE CONTROLLED STORAGE SYSTEM

The present invention relates to stacked, grid storage systems especially densely packed storage systems and methods of adjusting, regulating, controlling and maintaining the temperature of said storage systems.

This application claims priority from UK Patent Application Nos. GB1509661.3 filed on 3 Jun. 2015 and GB1604096.6 filed on 10 Mar. 2016 the content of all these applications hereby being incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be at least as high as the height of the largest stack of containers, so that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

It is a disadvantage of the prior art systems described above that the temperature within densely packed stacks is difficult to accurately regulate.

According to the invention there is provided an object handling system comprising two substantially perpendicular sets of rails forming a grid above a workspace, the workspace comprising a plurality of stacked containers, the handling system further comprising a plurality of robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the system further comprising one or more heater and/or one or more chiller for generating temperature controlled gas, one or more fan for circulating the temperature controlled gas through the storage system; and a plenum for receiving the temperature controlled gas.

In a preferred aspect the plenum has an opening adjacent a side of the grid of storage stacks.

In a preferred aspect in use the storage system generates a reservoir of temperature controlled gas in the storage system.

In a preferred aspect the reservoir of temperature controlled gas forms above the storage stacks.

In a preferred aspect the temperature controlled gas circulates around, under, over or through the storage container stacks.

In a preferred aspect the temperature of the storage system can be varied from −30° C. to +30° C.

In a preferred aspect the temperature of the storage system can be controlled within a range of ±2.5° C.

In a preferred aspect the temperature controlled gas is circulated through one or more apertures in the storage containers.

In a preferred aspect temperature controlled fluid is circulated through ducting.

In a preferred aspect the ducting runs through the walls and uprights and frame work structure of the grid.

In a preferred aspect the gas is air.

In a preferred aspect the gas is a coolant gas.

In a further aspect the invention relates to a storage container having one or more apertures in one or more sides.

In a preferred aspect the storage container further comprises ducting for receiving the temperature controlled fluid.

Figure 2:
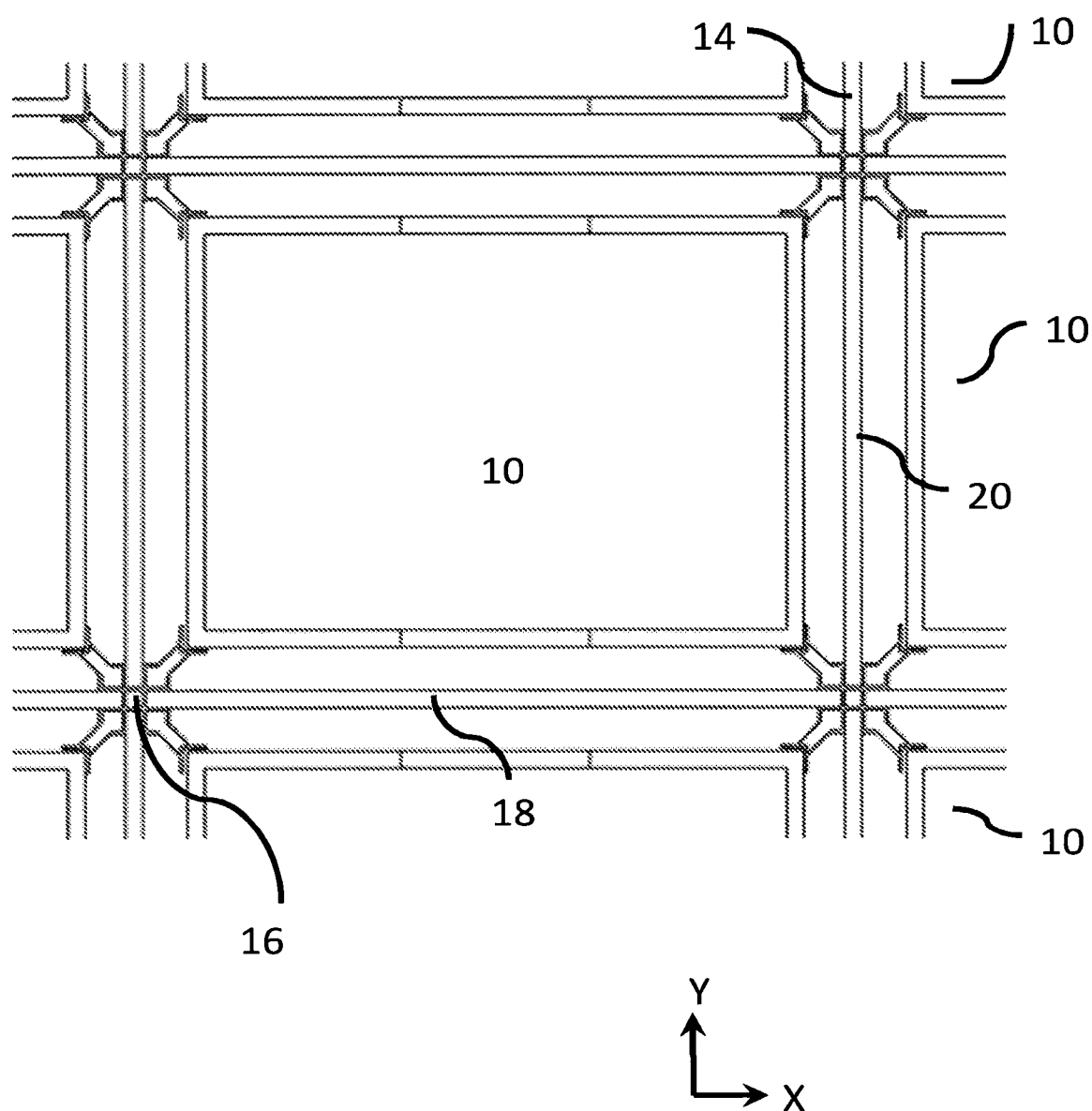
Figure 3:
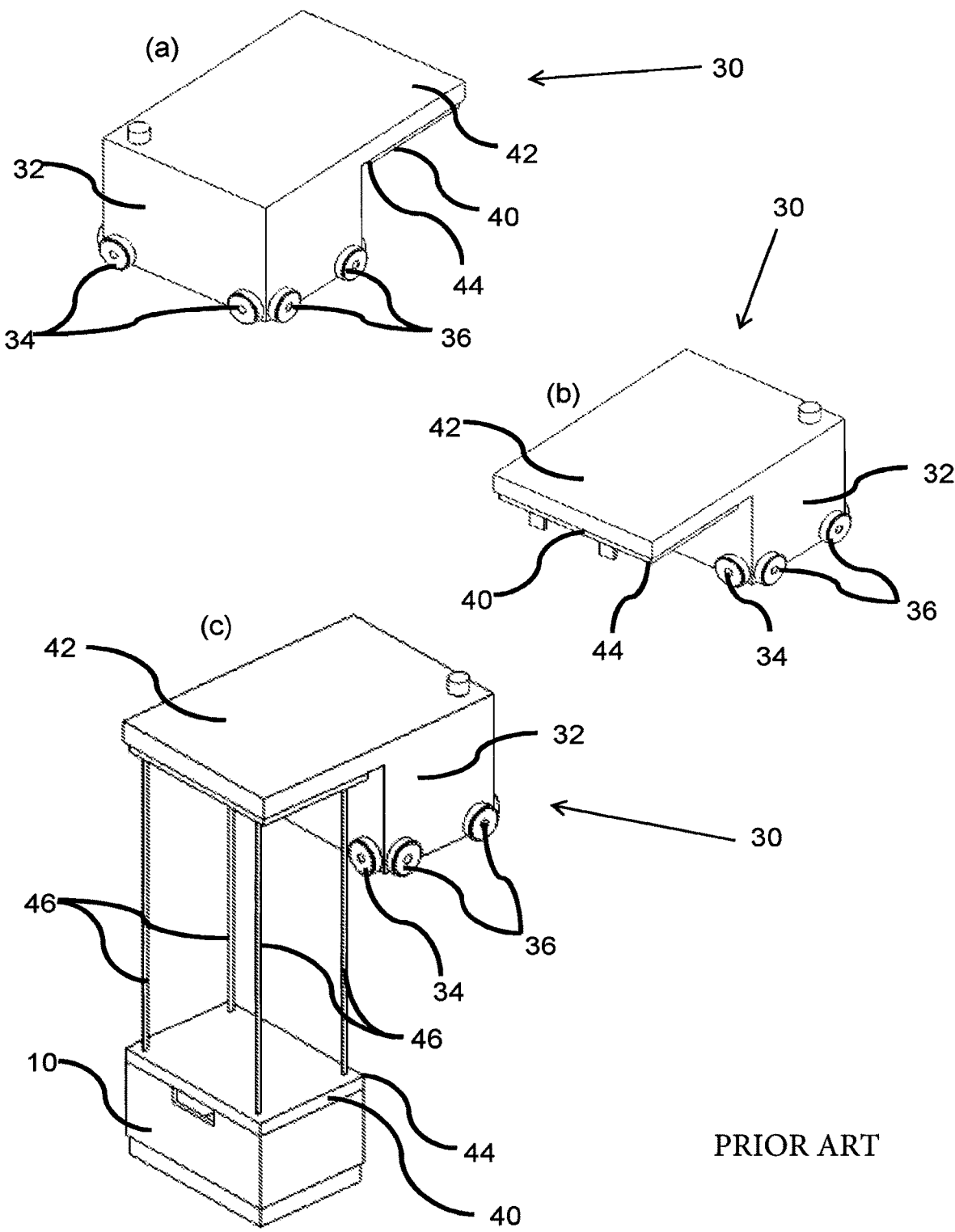
Figure 4:
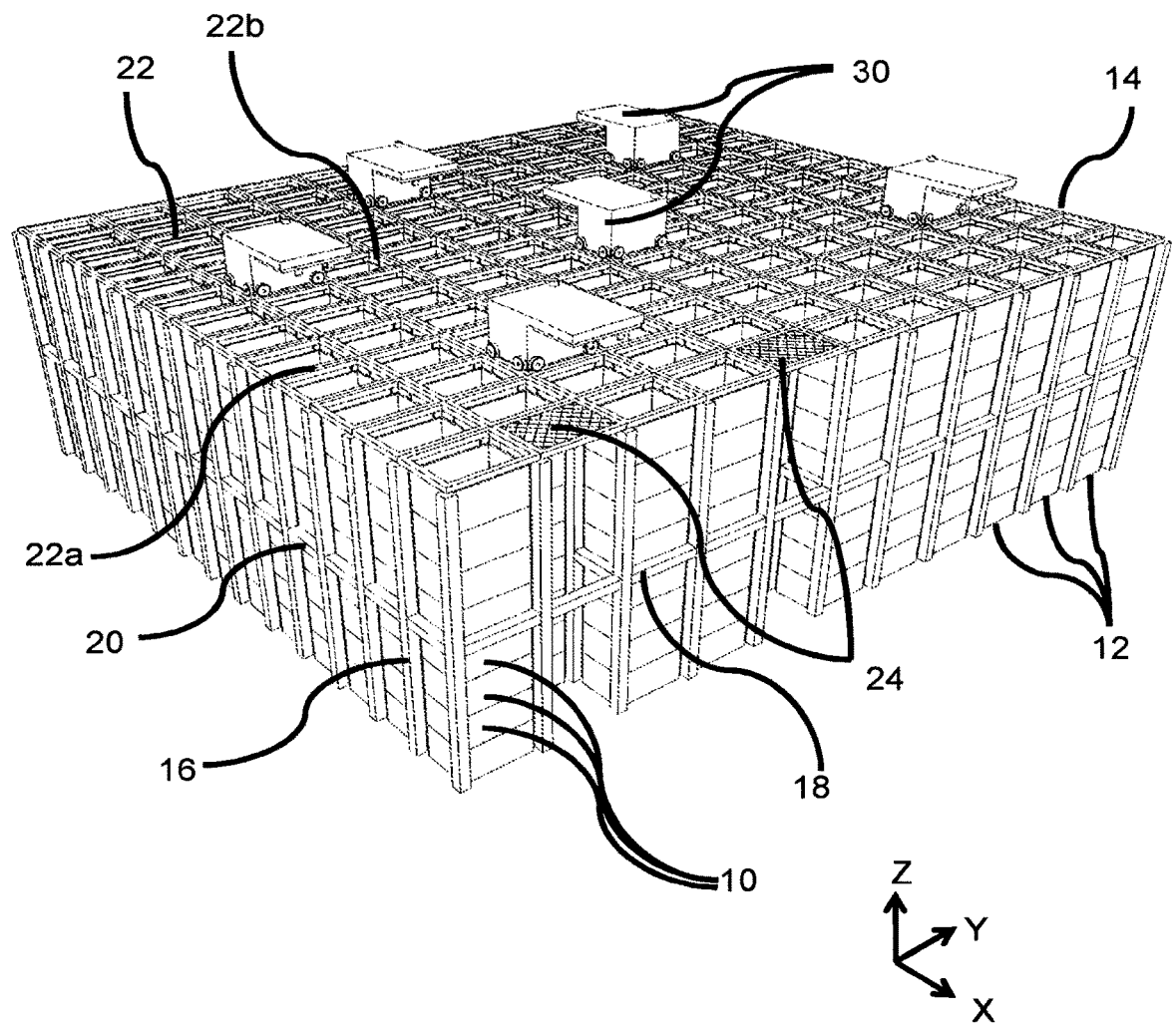
Figure 5A:
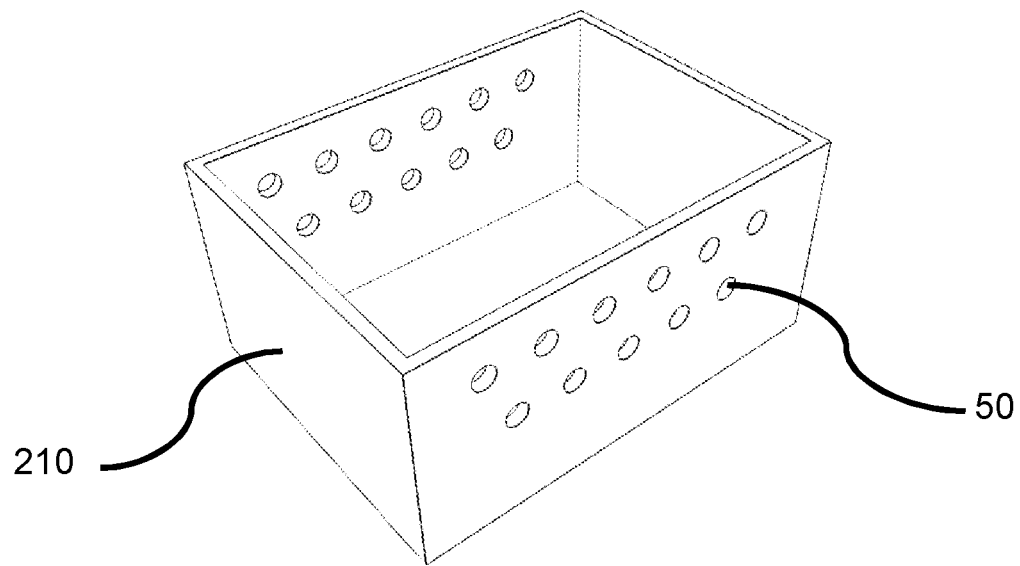
Figure 5B:
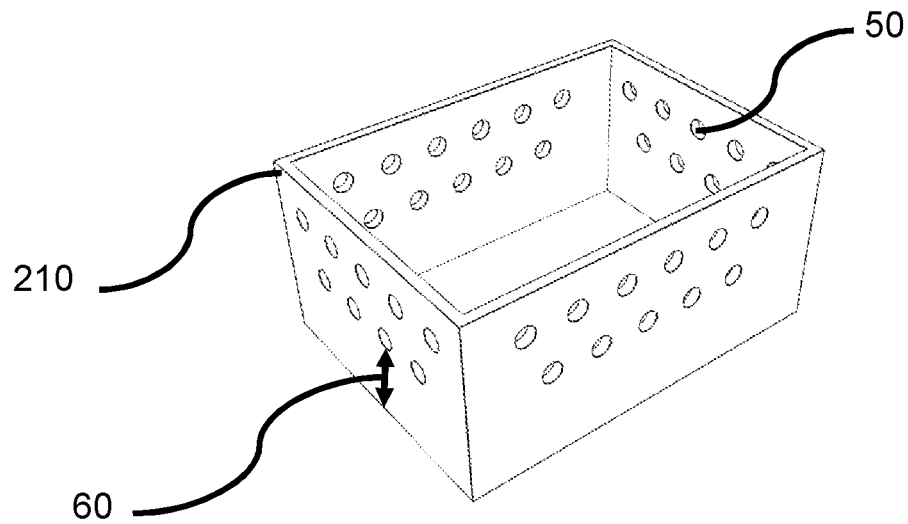
Figure 6A:
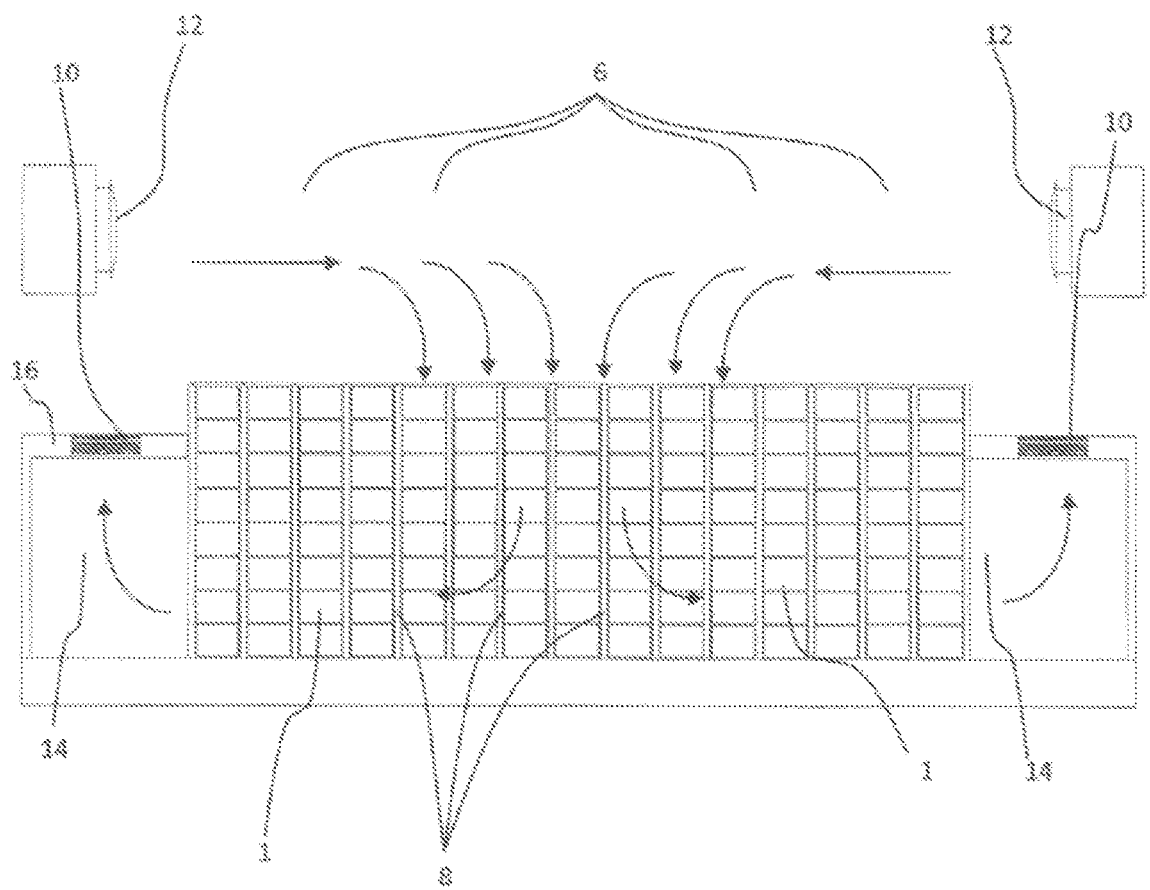

In this way, the present invention overcomes the problems of the prior art and provides a storage system capable of accurately maintaining and varying the temperature within a stacked grid storage system The invention will now be described with reference to the accompanying diagrammatic drawings in which:

FIG. 1: is a schematic perspective view of a frame structure for housing a plurality of stacks of bins in a known storage system;

FIG. 2: is a schematic plan view of part of the frame structure of FIG. 1;

FIGS. 3*a* and 3*b*: are schematic perspective views, from the rear and front respectively, of one form of robotic load handling device for use with the frame structure of FIGS. 1 and 2, and FIG. 3*c* is a schematic perspective view of the known load handler device in use lifting a bin;

FIG. 4: is a schematic perspective view of a known storage system comprising a plurality of load handler devices of the type shown in FIGS. 3a, 3b and 3c installed on the frame structure of FIGS. 1 and 2, together with a robotic service device;

FIGS. 5a and 5b: are schematic perspective views of two forms of container which form a major component of the storage system of the present invention;

FIG. 6a: is a side elevation of one embodiment of the storage system according to the present invention comprising multiple stacks showing the air movement within said storage system.

Figure 6B:
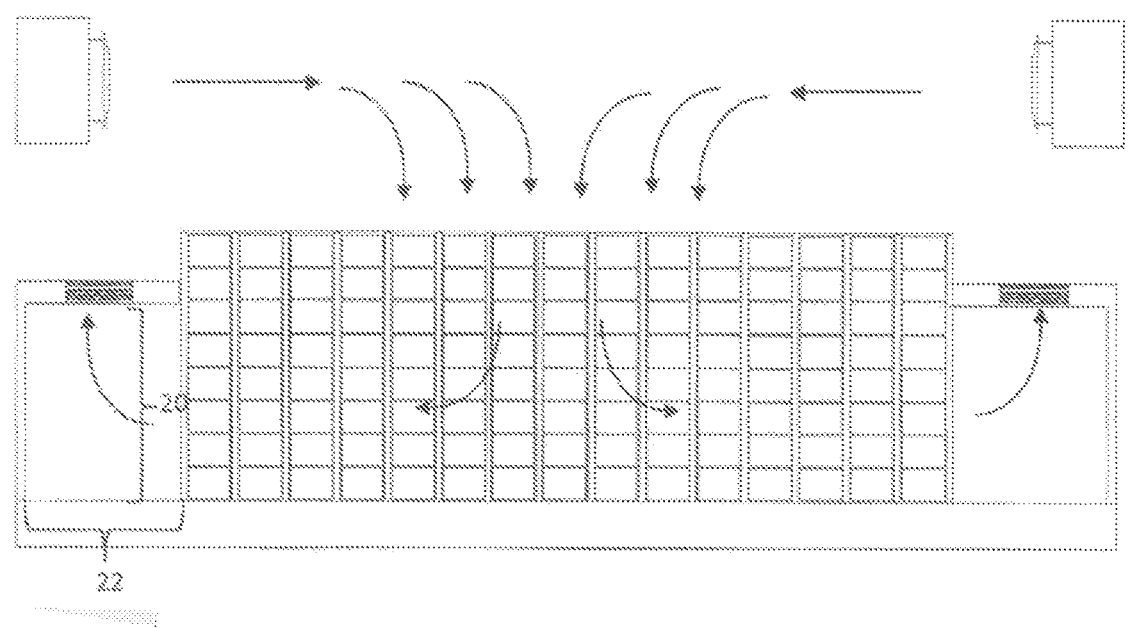

FIG. 6b: is a side elevation of a second embodiment of the storage system according to the present invention comprising multiple stacks and showing the air movement within said storage system.

Figure 7A:
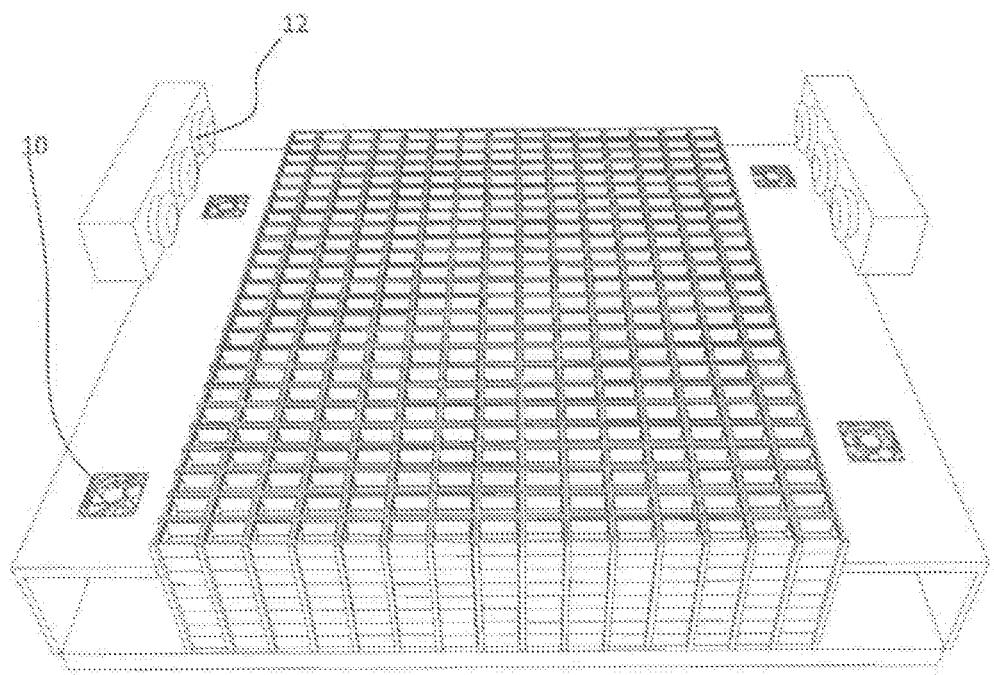

FIG. 7a: is a schematic perspective view of the storage system shown in FIG. 6a showing the arrangement of the stacks in a grid the chiller units 12 and the fans 10.

Figure 7B:
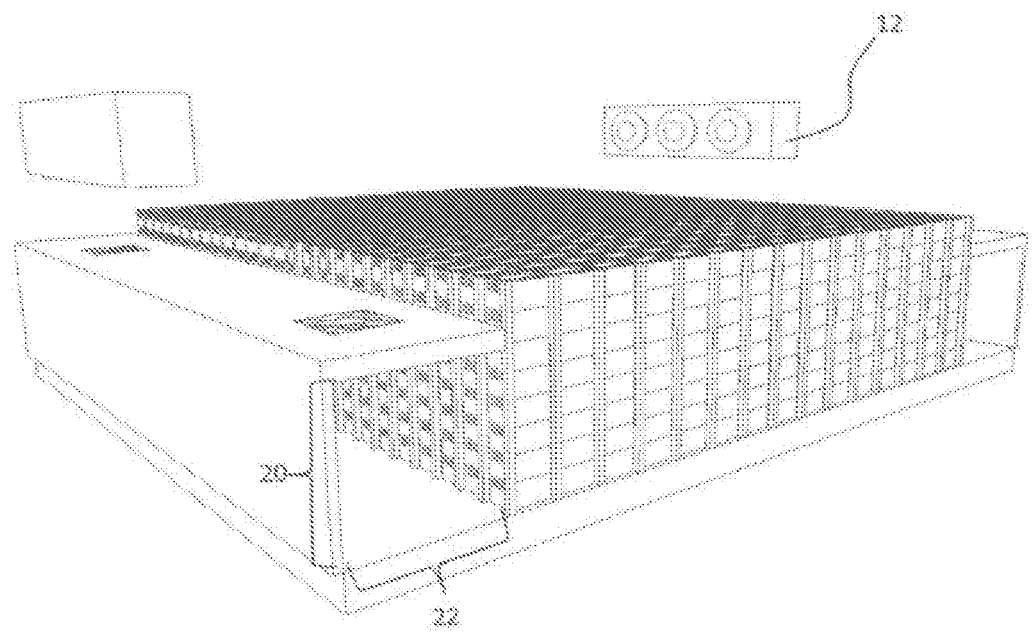

FIG. 7b: is a schematic perspective view of the storage system shown in FIG. 6a showing the plenum.

Figure 8:
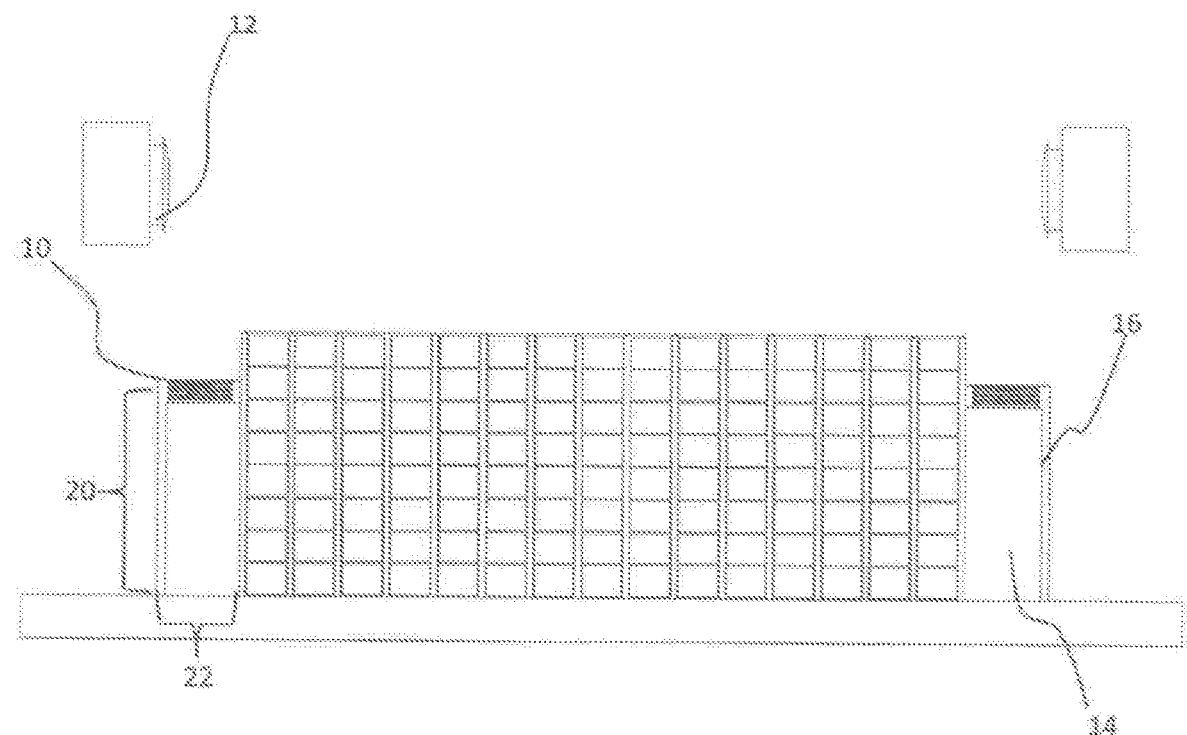

FIG. 8: is a side elevation of an alternative embodiment of the storage system showing the chillers 12 set back from the plenums 14.

Figure 9:
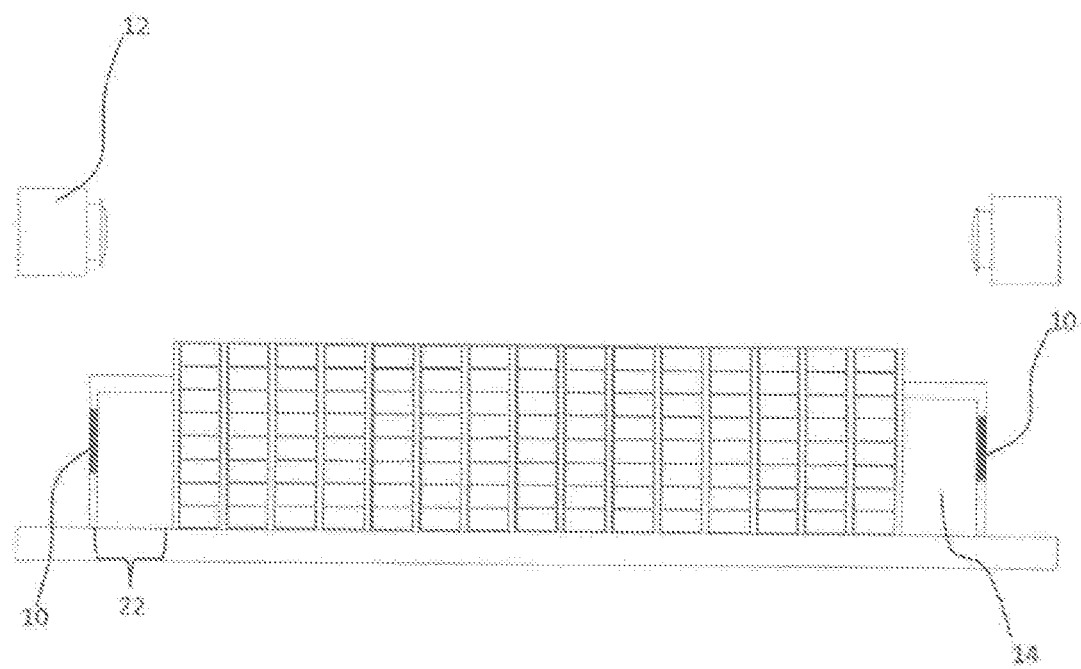

FIG. 9: is a side elevation of an alternative embodiment of the storage system showing the fans 10 located on a vertical side of the plenums 14.

Figure 10:
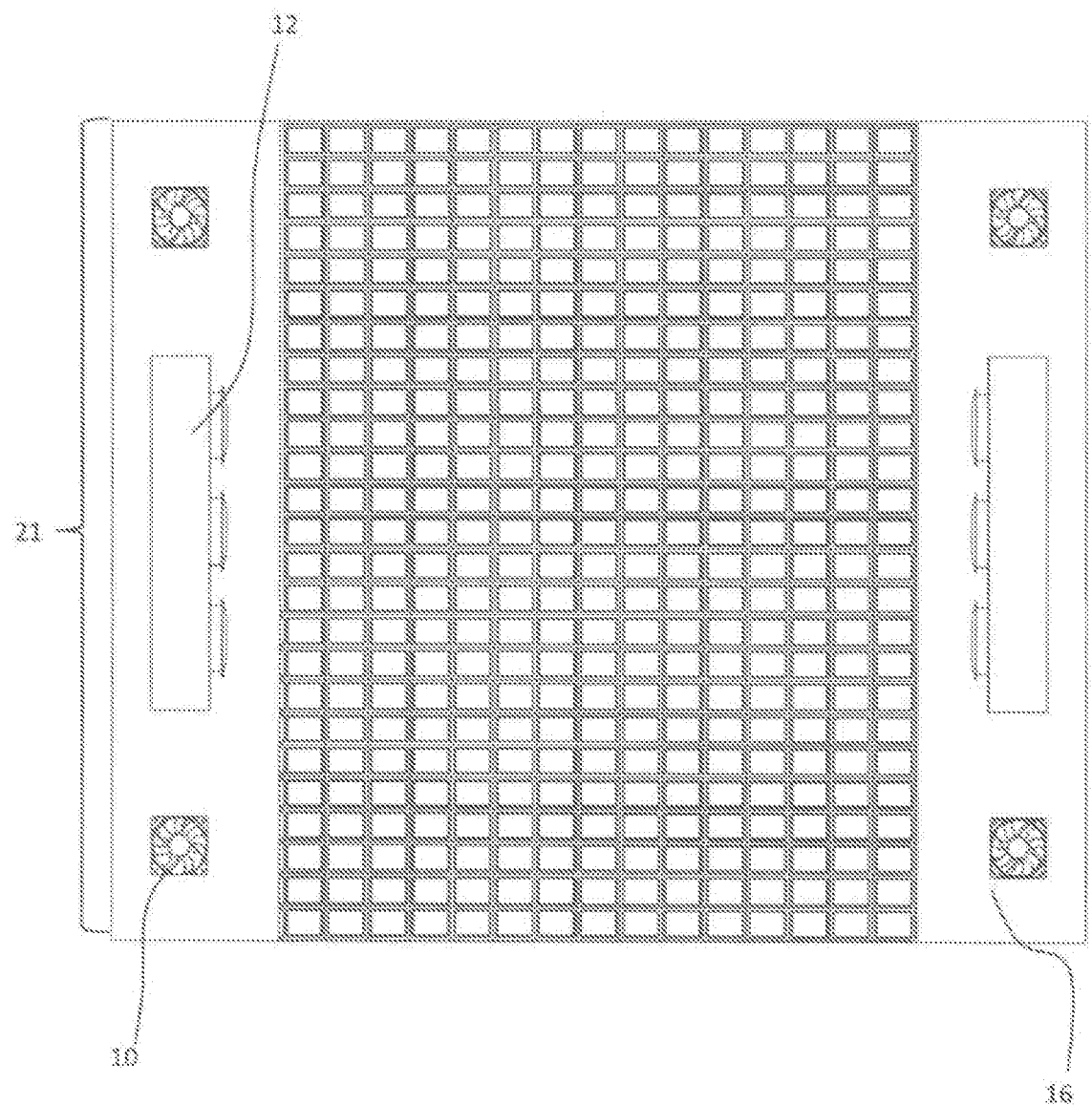

FIG. 10: is a plan view of the storage system shown in FIG. 6a

Figure 11:
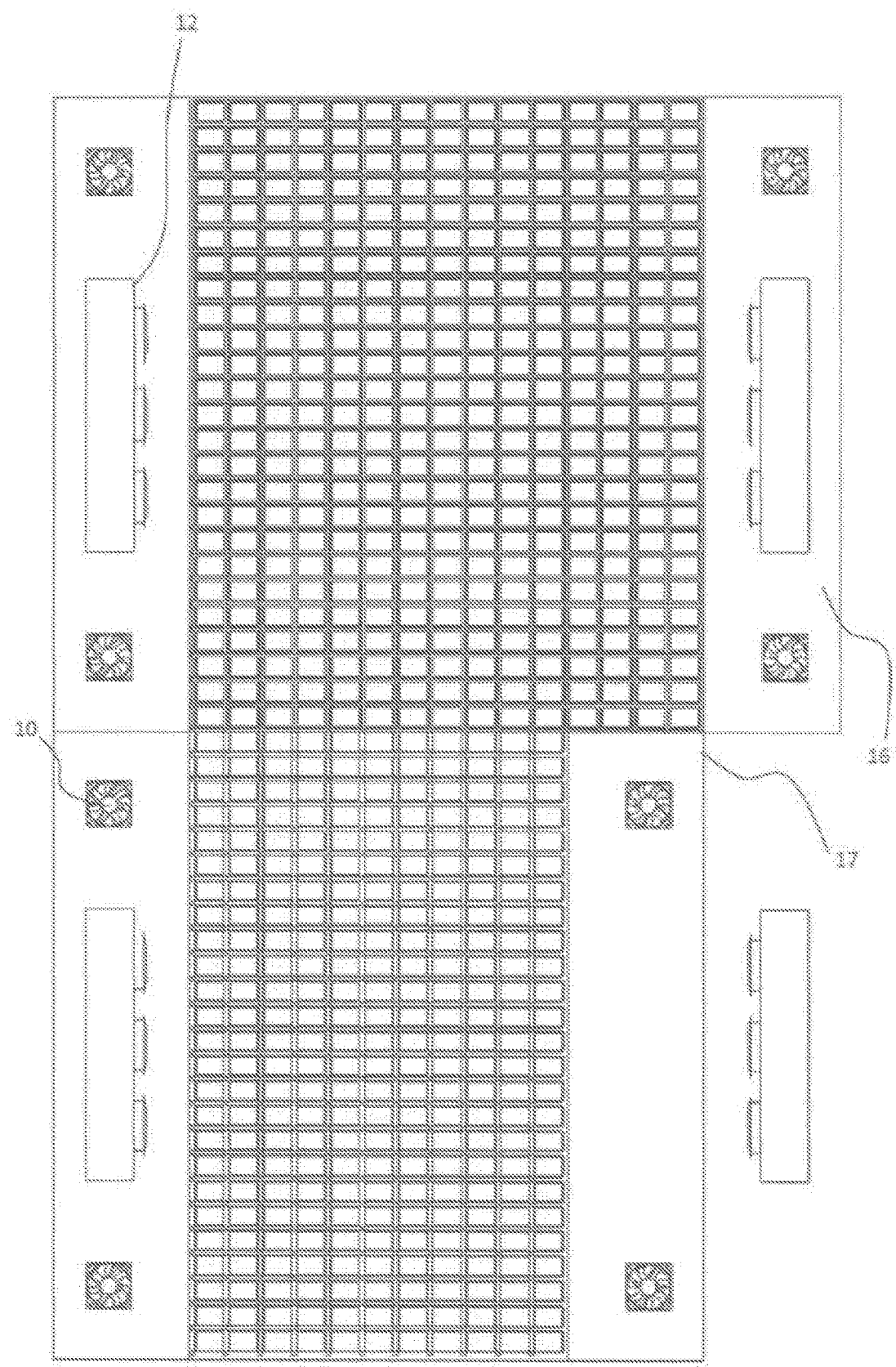

FIG. 11: is a plan view of an alternative embodiment of the storage system in which the stacks are of different widths showing how the plenum follows the edge of the grid storage system.

Figure 12:
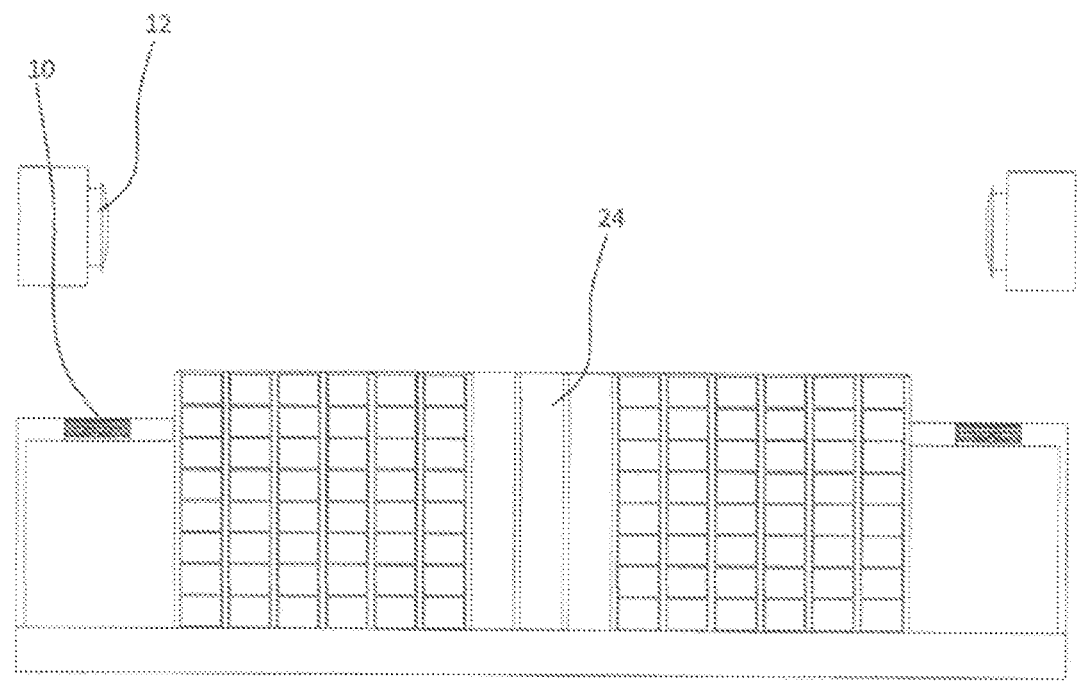

FIG. 12: is a side elevation of another embodiment of the storage system in which a number of empty rows 24 are located within the grid of stacks.

Figure 13:
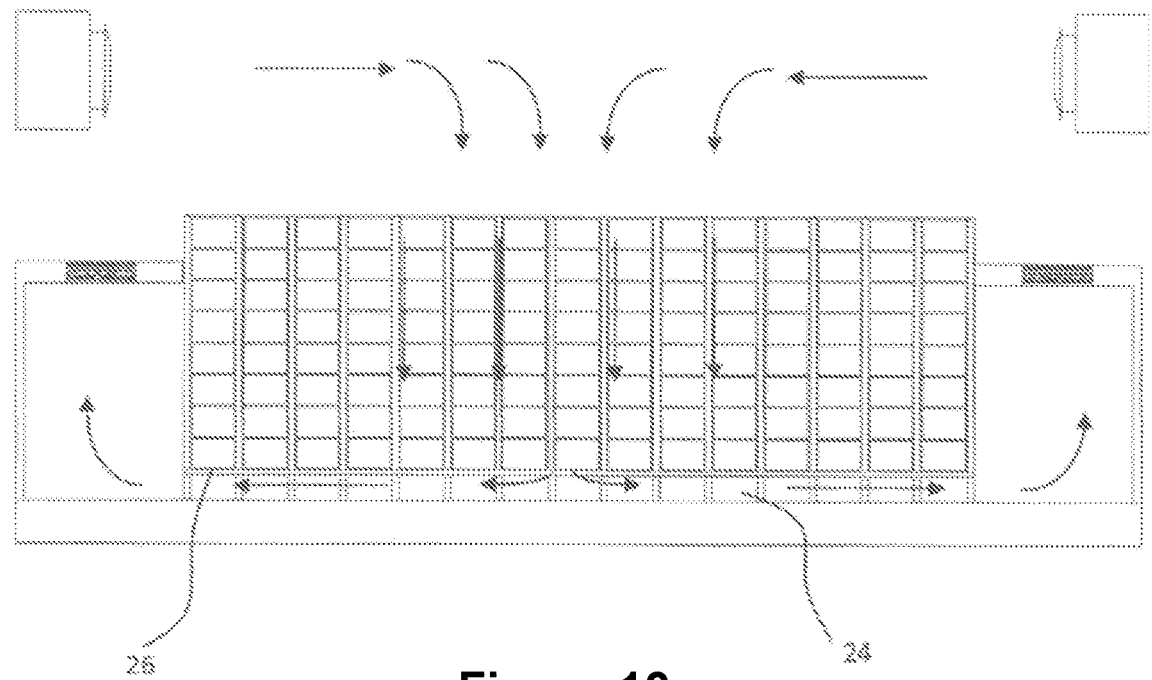

FIG. 13: is a side elevation of another embodiment of the storage system in which the stacks are raised above the floor showing air being drawn through the system and into the vacant space under the stacks.

Figure 14:
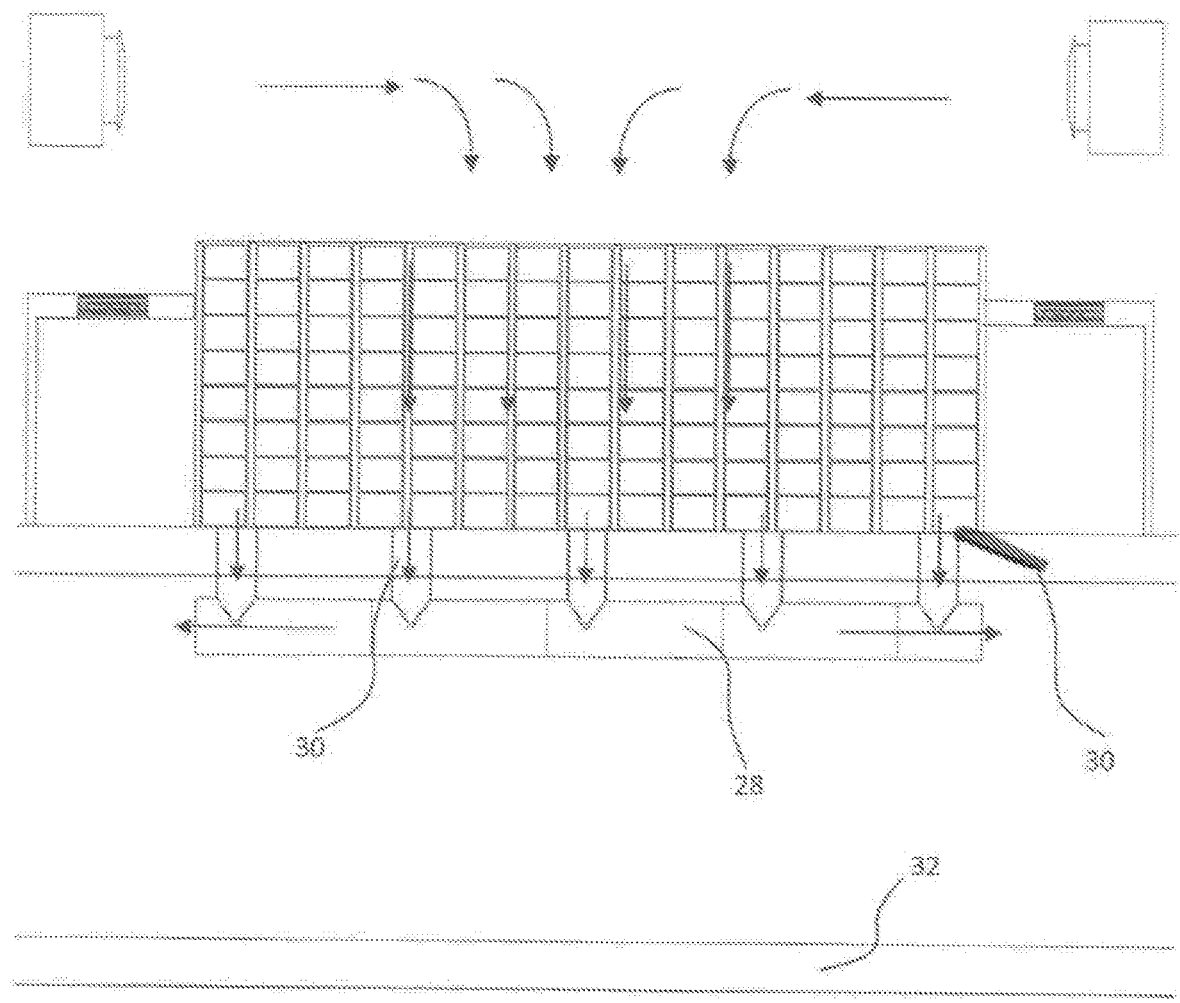

FIG. 14: a side elevation of another embodiment of the storage system on a mezzanine floor above ground level 32 showing the movement of air through vertical ducting 30 and horizontal ducting 28.

Figure 15A:
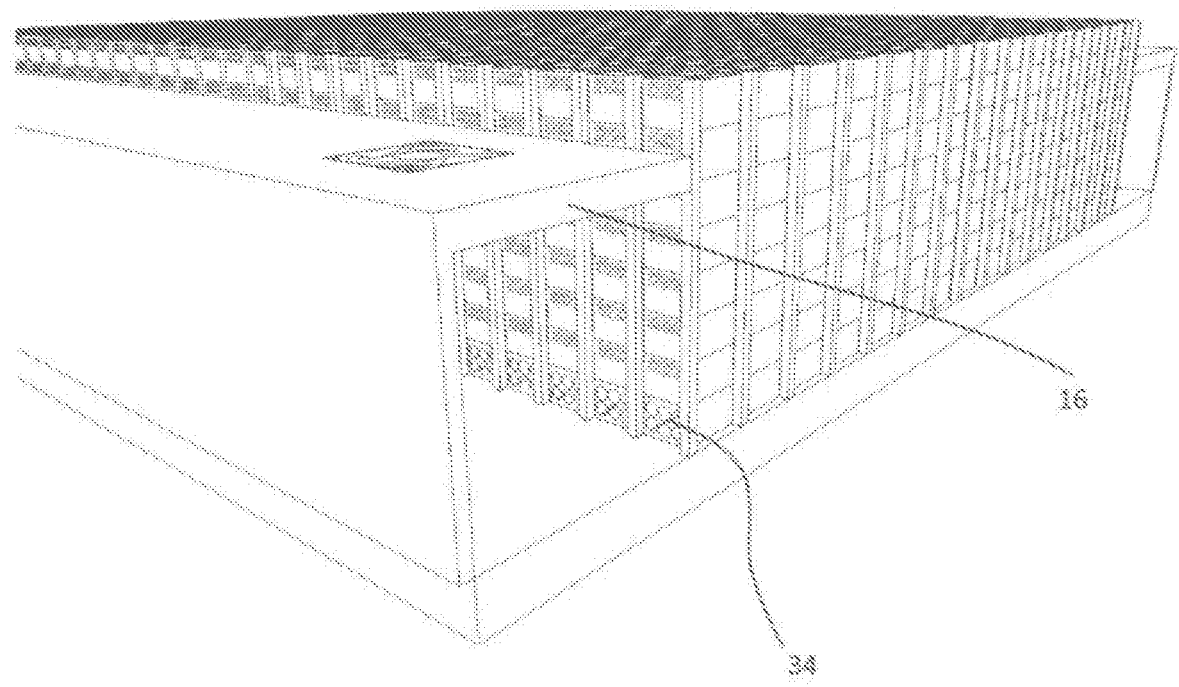
Figure 15B:
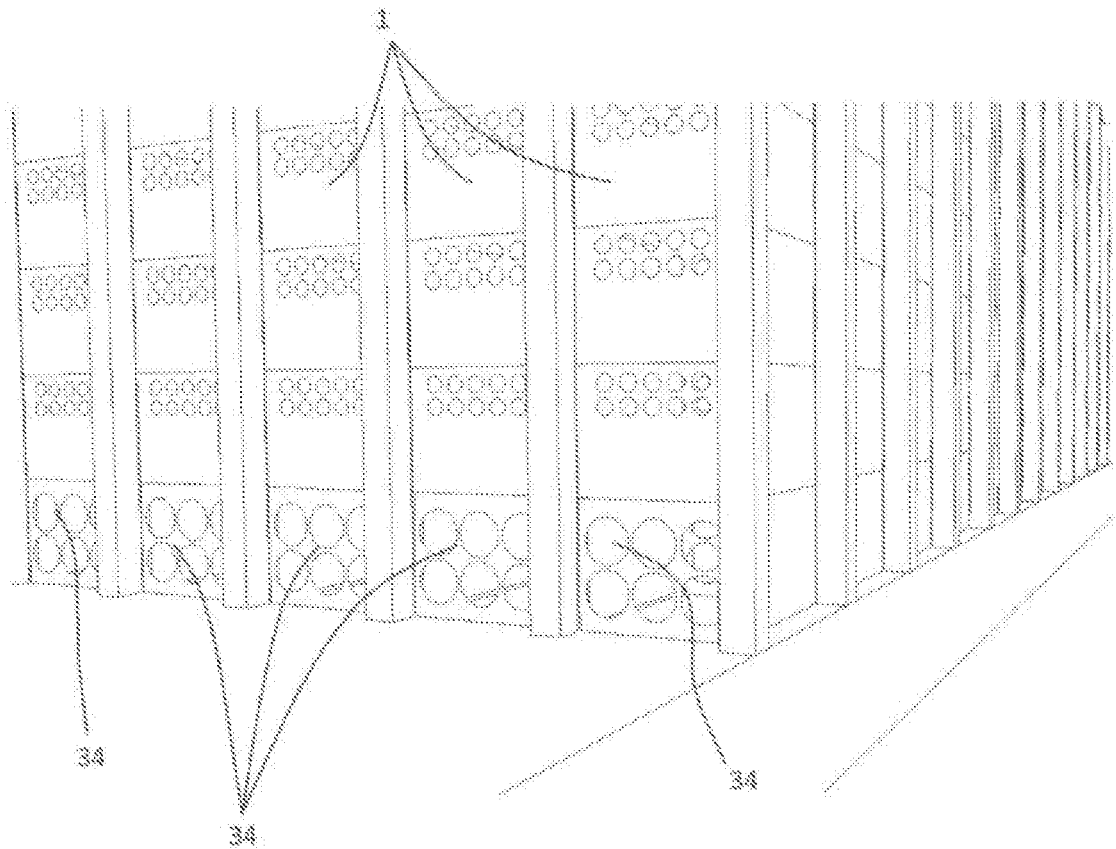

FIGS. 15a and 15b: are schematic perspective views of another embodiment of the storage system in which storage containers having additional and larger apertures 34 are used on the bottom level of each stack to allow greater air flow.

Figure 16A:
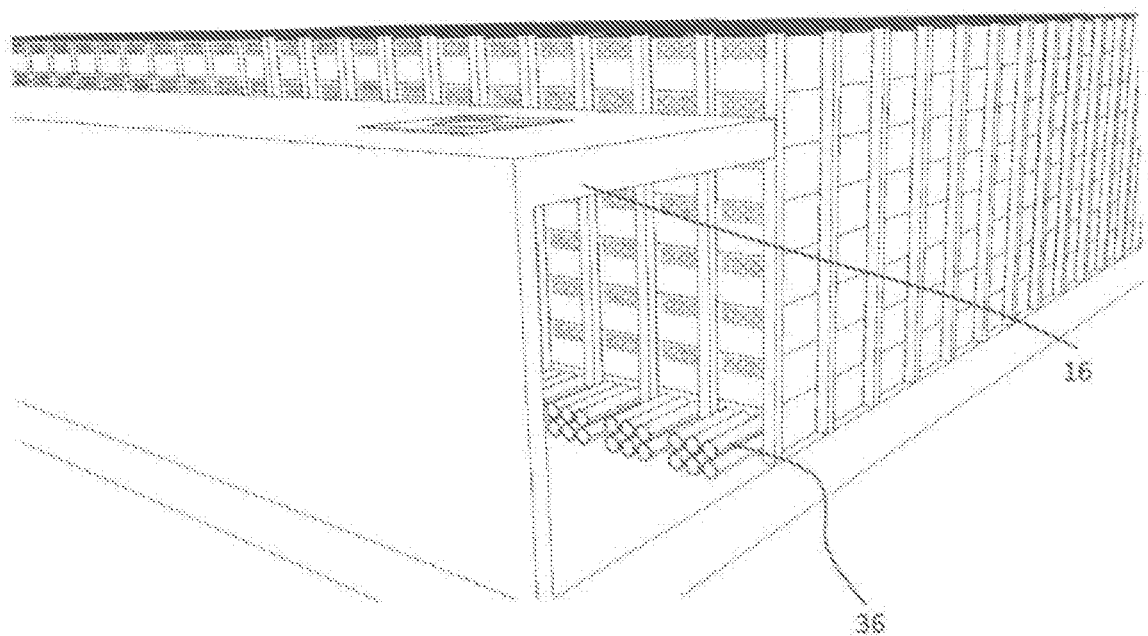
Figure 16B:
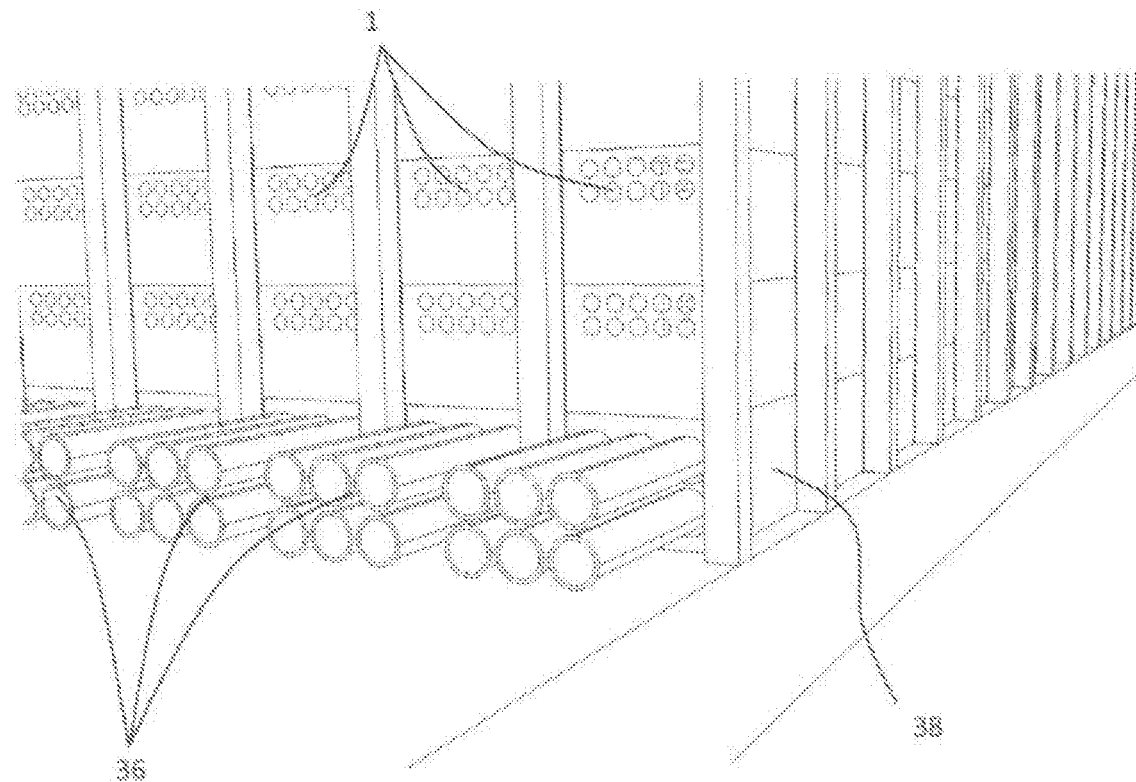

FIG. 16a, 16b: are schematic perspective views of another embodiment of the storage system in which ducting 36 runs through the storage containers to increase air flow.

Figure 17A:
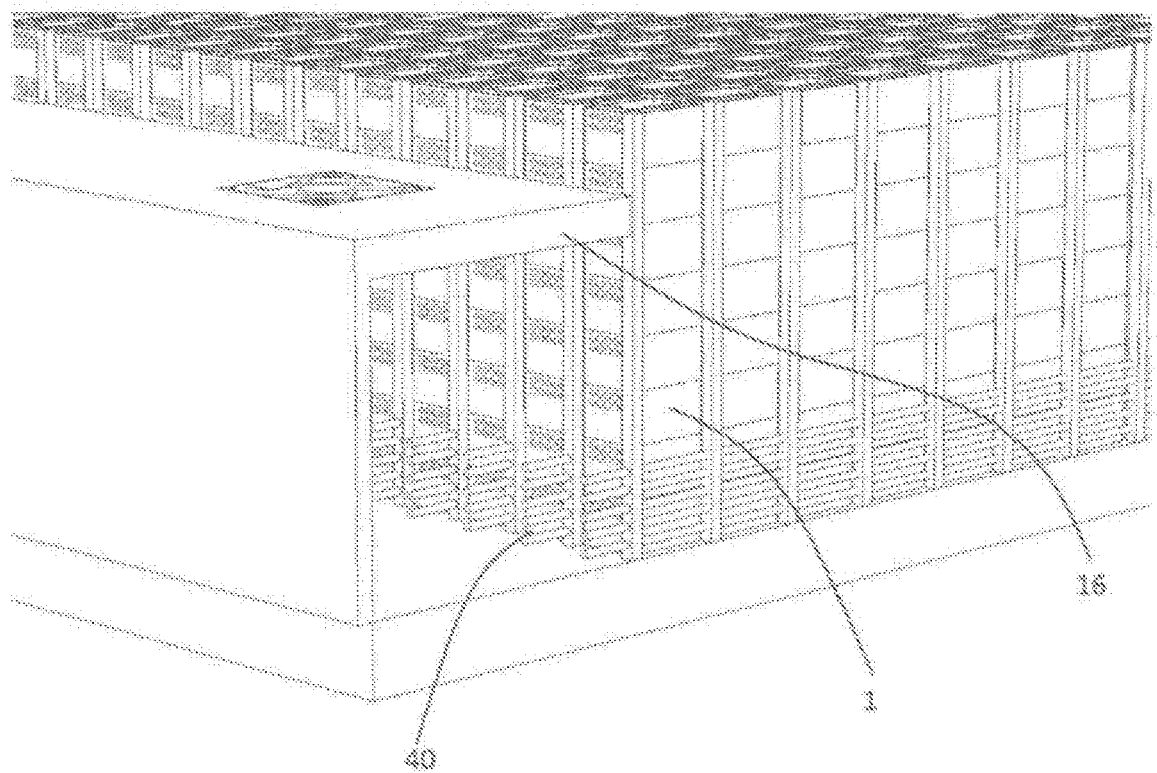
Figure 17B:
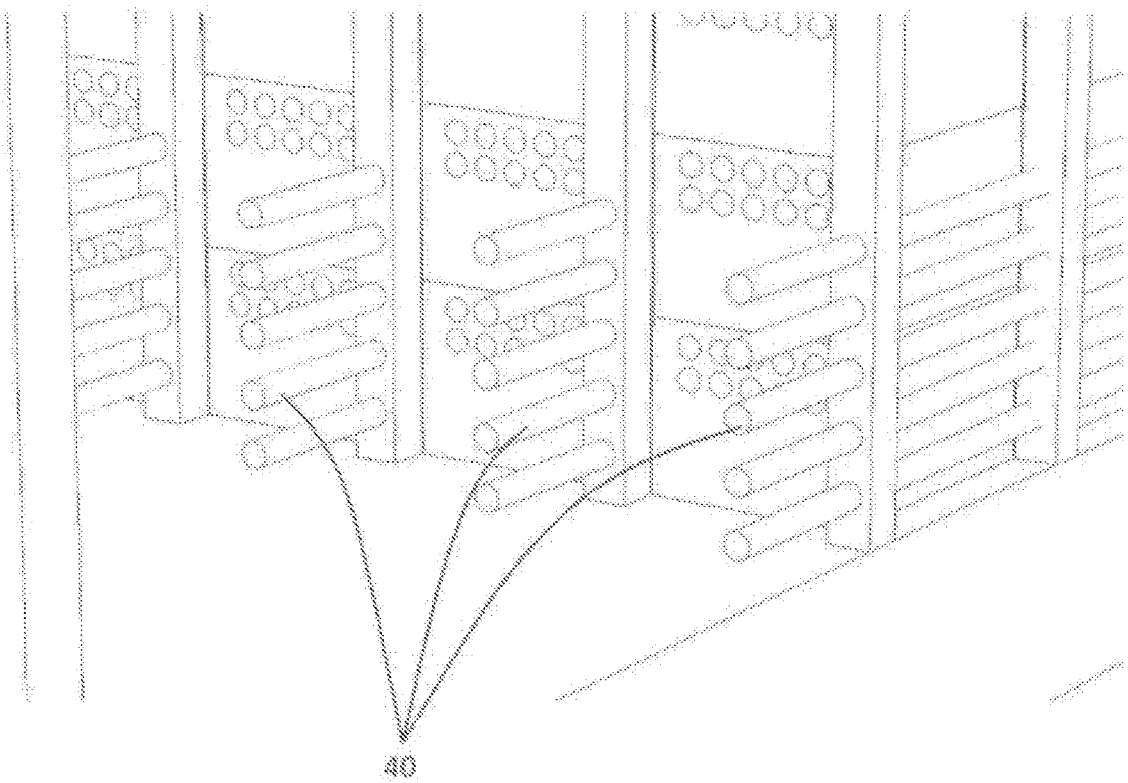

FIGS. 17a and 17b: are schematic perspective views of another embodiment of the storage system in which tubes 40 are provided in the walls of the grid to assist air circulation between the storage stacks.

As used herein the term plenum is a space or chamber for receiving heated or cooled air.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism 20 (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

It will be noted from the description above and with reference to the drawings, that the portion of the load handling device 30 carried by the wheels covers one grid spacing of the grid system above the stack.

FIG. 4 shows a typical storage system as described above, the system having a plurality of load handling devices 30 active on the stacks 12.

With reference to FIG. 5 the storage system of the present invention comprises a series of storage bins or containers 1 stacked one on top of another to form a storage stack 12.

As shown in FIG. 5 each storage container may have one or more aperture 50 in one or more side to allow air to circulate freely through the storage container. This container can vary in shape and size.

The apertures are shaped and sized such that they do not undermine the strength or structural integrity of the storage container. Preferably between 5% and 20% of the surface area of the side of the storage container should be open in the form of apertures to allow air flow through the container. Apertures may be provided in 2, 3, 4, 5 or 6 sides of the container.

As shown in FIG. 6a a plurality of stacks are arranged in a grid frame structure 8 to form a high density grid storage system.

One or more chiller units 12 are located above the storage stacks and form a reservoir 6 of cooled air above the storage stacks. As shown by the arrows in FIGS. 6a and 6b the cooled air moves between, around and through the storage stacks and enters a plenum 14.

The plenum 14 comprises a channel of height 20 and width 22. The width 22 of the plenum 14 can vary from 1 m to 4 m. The height of the plenum 20 can vary from the same height as the storage system to 2 m below the top of the storage system.

The plenum is sealed on three sides. The plenum has an opening adjacent the storage stacks.

As shown in FIGS. 7a and 7b the plenum 14 is located along one or more side of the grid of stacks.

One or more fans 10 are located either on the top of the plenum 14 as shown in FIG. 6 or on the vertical face of the plenum as shown in FIG. 9.

The one or more fans 10 helps to circulate the cooled air from the reservoir 6 through around, and between the storage stacks to the plenum 14

As the cooled air circulates through the storage system it adjusts the temperature of the storage stacks and their contents.

The chiller units 12 units can be located either directly above the plenums as shown in FIG. 6 or they can be set back as shown in FIG. 8. The key requirement is that a reservoir of cooled air 6 is created above the storage system.

The number, size and location of chiller units will vary depending on the size of the storage system.

The width of the storage system 18 can vary from 15 m to 80 m, however, it will be appreciated that any width of storage system may be envisaged with suitable adjustments to the equipment required.

The length 21 of the storage system has no upper limit. Multiple plenums, fans, and chillers can be positioned periodically along the entire length of the storage system to achieve the desired level of temperature control.

The height 25 of the system can be up to 7.8 m high.

The power and number of fans 10 depends on the size of the system with diameter of the fans varying from 0.5 m to 2.5 m.

In an alternative embodiment the chillers 12 may be replaced with heaters which form a reservoir 6 of heated air.

In an alternative embodiment the chiller units may be supplemented by heater units. The reservoir 6 is then one of temperature controlled air.

In an alternative embodiment the reservoir 6 may be formed under the storage stacks.

In an alternative embodiment a gas other than air e.g. a coolant may be circulated in the storage system to better assist temperature regulation.

In an alternative embodiment the chillers 12 may be replaced with heaters which form a reservoir of heated air above the storage stacks.

The temperature of the storage system can be controlled within a range of ±2.5° C.

The temperature within the storage system can be varied from −30° C. to +30° C.

Referring to FIG. 11 which is a plan view of an alternative embodiment of a storage system of the present invention in which the stacks within the grid storage system are of different widths. The plenum follows the edge of the storage system grid even as the width of the grid changes.

The plenum does not need to provide a uniform, continuous straight channel to be effective.

FIG. 12 shows an alternative arrangement in which one or more rows 24 are omitted within the grid of stacks. These empty rows 24 allow some of the cold reservoir air to fall through the storage system and thus promote additional air flow through the stacks of containers. The width of empty rows can vary from 0.5 m wide to 2 m wide. Optionally the empty rows can be partially filled with empty or filled storage containers.

FIG. 13 shows the system raised above the floor 30. In this embodiment air is circulated around, though between and under the stacks to regulate their temperature.

FIG. 14 shows a storage system on a mezzanine floor raised above ground level 32. Air travels from the reservoir though the stacks to vertical 30 and horizontal 28 ducting located in the mezzanine floor. The ducting channels air under the stacks and towards the plenum.

FIG. 15 shows the use of storage containers of a different design on the bottom level of each stack. The containers have additional and larger apertures 34 in them to allow greater air flow but still have sufficient strength to be able to support storage containers stacked on top of them.

With reference to FIG. 16 in an alternative embodiment the storage containers on the bottom level of one or more stack comprise ducting 36 running through the container to further aid the circulation of temperature controlled gas from reservoir 6 or temperature controlled fluids from elsewhere.

With reference to FIG. 17 in an alternative arrangement, tubes 40 are provided in the walls 8 of the grid to further aid the circulation of temperature controlled gas from reservoir 6 or temperature controlled fluids from elsewhere to reduce the temperature variation throughout the storage stacks. The tubes 40 can be used to either draw or force fluids through the storage system.

Moreover, the temperature controlled air may be further directed and circulated through ducting or holes and cavities within the uprights and framework 14 structure of the storage system.

It will be appreciated that the foregoing embodiments are described in terms of a temperature control system for a storage system such as that used as part of an online retail operation. However, it will be appreciated that a similar form of temperature control system may be used in a similar structure of storage system used for other applications. For example, use of such storage systems has been envisaged for a mechanized greenhouse wherein the containers 10 contain plants or other living organisms growing under controlled conditioned. In such systems, control of temperature may be critical but additionally humidity, air flow and other environmental variables may require control. It will be appreciated that use of the temperature controlling system hereinbefore describe may advantageously assist in the control of humidity, air flow and the like.

It has been shown that the growth of plants and other living organisms has been greatly affected by air flow across said plants or organisms. Accordingly, the use of a temperature control system based on air flow may be advantageous in such applications.

Many variations and modifications not explicitly described above are also possible without departing from the scope of the invention as defined in the appended claims.

The invention claimed is:

1. A storage system, comprising:
   two substantially perpendicular sets of rails forming a grid above a workspace, the workspace having a plurality of stacked containers, each stack of containers in the workspace corresponding to an opening in the grid;
   a plurality of robotic load handling devices operating on the grid above the workspace, the load handling devices having a body mounted on wheels, a first set of wheels being arranged to engage with at least two rails of the first set of rails, a second set of wheels being arranged to engage with at least two rails of the second set of rails, the first set of wheels being independently moveable and driveable with respect to the second set of wheels such that, when in motion, only one set of wheels is engaged with the grid at any one time, thereby enabling movement of the load handling devices along the rails to any point on the grid by driving only the set of wheels engaged with the rails, the load handling devices accessing one or more stacked containers through the corresponding opening in the grid;
   at least one heater and/or at least one chiller for generating a temperature controlled gas, and at least one fan for circulating the temperature controlled gas through the storage system;
   a plenum for receiving the temperature controlled gas; and
   a duct arrangement including one or more substantially vertical ducts extending from the workspace through a mezzanine floor and a substantially horizontal duct located beneath the mezzanine floor and connected to the one or more substantially vertical ducts for channelling the temperature controlled gas under the workspace towards the plenum.

2. The storage system as claimed in claim 1 configured such that the temperature controlled gas circulates around, under, over or through the storage container stacks.

3. The storage system as claimed in claim 1, wherein a temperature of the storage system can be varied from −30° C. to +30° C.

4. The storage system as claimed in claim 1 wherein the temperature of the storage system is configured to be controlled within a range of ±2.5° C.

5. The storage system as claimed in any claim 1, configured for temperature controlled gas to circulate through one or more apertures in the stacked containers.

6. The storage system as claimed in claim 1, wherein the gas is air.

7. The storage system as claimed in claim 1, wherein the gas is a coolant gas.

8. A storage container in combination with the storage system as claimed in claim 1, the storage container having one or more apertures in one or more sides.

9. The storage container as claimed in claim 8, comprising:
   ducting for receiving a temperature controlled fluid.

10. A storage container for said storage system as claimed in claim 1, in which the storage system is configured for growing of plants or other living organisms and the storage container includes plants or other living organisms.

11. The storage system or the storage container for said storage system as claimed in claim 10, configured such that humidity and/or airflow throughout the storage system is controlled via circulation of temperature controlled air throughout the storage system.

12. The storage system as claimed in claim 1 configured for growing plants or other living organisms and one or more stacked containers includes plants or other living organisms.

13. The storage system as claimed in claim 1, wherein one or more of the plurality of ducts is configured to receive the temperature controlled gas from the reservoir.

14. The storage system as claimed in claim 1, which in use generates a reservoir of temperature controlled gas in the storage system.

15. The storage system as claimed in claim 14, wherein the reservoir of temperature controlled gas forms above the storage stacks.

* * * * *